Nov. 4, 1941.  G. S. SMITH  2,261,301

SIDE AND REAR VISION REFLECTOR FOR MOTOR VEHICLES

Filed Oct. 19, 1940

INVENTOR.
BY George S. Smith,

Patented Nov. 4, 1941

2,261,301

UNITED STATES PATENT OFFICE 2,261,301

SIDE AND REAR VISION REFLECTOR FOR MOTOR VEHICLES

George S. Smith, Chicago, Ill.

Application October 19, 1940, Serial No. 361,948

1 Claim. (Cl. 88—98)

My present invention relates to improvements in and the provision of side and rear vision reflectors for motor vehicles. In other words it is my object to provide a structure which is as simple as possible and will, therefore, be economical to manufacture, which will be free from complications both in installation and use, and which will provide an easy, ready and instantaneous view of what may be occurring immediately at the side and to the rear of the car.

The desirability of devices affording such facilities has heretofore been recognized as it is clearly seen that there are times during the maneuvering of a vehicle when even the moment necessary for turning the head to look around cannot be spared. With commercial vehicles for carrying merchandise or otherwise, where the body obstructs a view to the rear, a mirror is generally rigged out upon a bracket attached to the body of the chassis in such a position as to reflect to the driver the view which is at the side and to the rear of the vehicle. With enclosed passenger automobiles it is now the almost universal practice to mount a mirror, by means of a suitable bracket, on the inside and about the center of the body, either to the top or front wall, so that it will reflect, to the driver's position, what may be seen through the rear window of the vehicle. Such an arrangement is fairly satisfactory but it does not disclose a view of what may be immediately at the side and to the rear of the vehicle.

The current styles of enclosed passenger motor vehicles, for the control of ventilation, pretty generally glaze, at least, the front side windows with a pair of panes coming into more or less of an approximation along a vertical line, one or both of the panes being mounted and adjustable upon a vertical axis so that the plane of the pane may be tilted and adjusted obliquely to the usual direction of, or fore and aft axis of, the vehicle.

I have availed myself of the above described construction to provide an extremely simple and inexpensive and, at the same time, neat and elegant side and rear view reflector which is attachable and detachable and adjustable both vertically and horizontally to reflect to the driver's eyes the view at the side and to the rear of the vehicle whether the driver be tall or short and no matter at what angle the pane of the front window may be adjusted.

I have accomplished the foregoing objects and attained the aforementioned results by means of the structure illustrated in the accompanying drawing, in which—

Similar reference characters refer to similar parts throughout the respective views.

Figure 1:
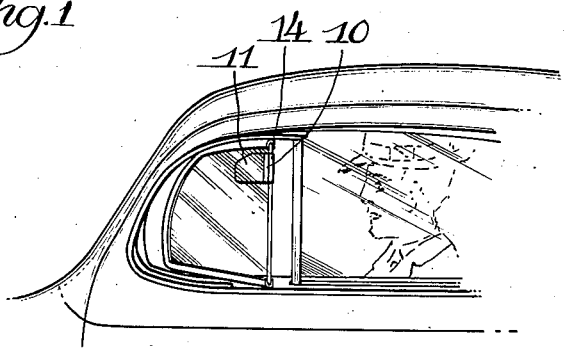
Fig. 1 is a fragmental view of a motor vehicle with my reflector installed thereon.
Figure 2:
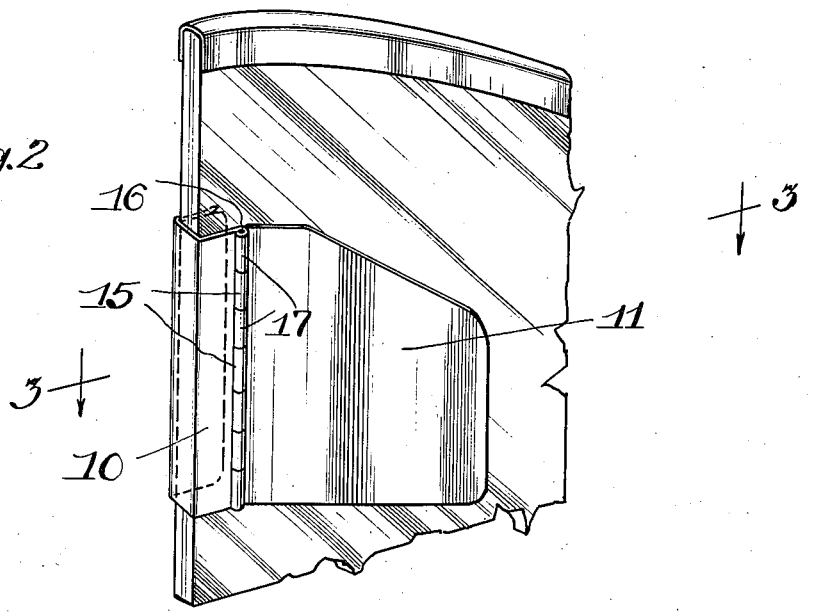
Fig. 2 is a fragmental detail showing an assembly of my reflector and the pane, or window element, of a motor vehicle
Figure 3:
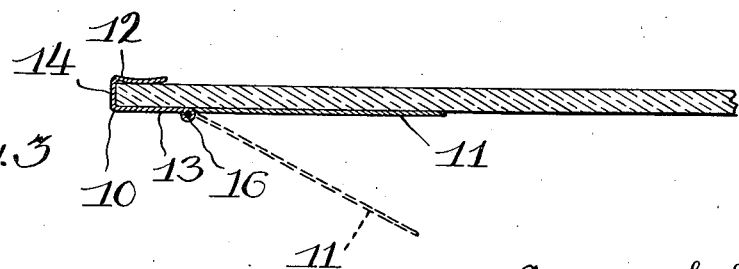
Fig. 3 is a section line on 3—3 of Fig. 2.

My device may advantageously be formed from a sheet of light gauge rustless steel which is polished, or otherwise treated, to provide at least one reflecting surface. A sheet of any material, however, which may be given a reflective surface and which has sufficient elasticity, as hereinafter described, may be employed.

In this country, by both law and custom, overtaking vehicles generally pass the overtaken vehicles upon the left side of the overtaken vehicle, and, therefore, a left handed side and rear view mirror will be of considerably greater use. I have, therefore, illustrated a left hand reflector, although, as is obvious, a right handed reflector may be provided upon the very same principles.

My device consists of a clamp member, 10, and a reflector member, 11. The clamp member is cut and formed by stamping operations, or otherwise, to provide a channel consisting of flanges 12 and 13 and connecting web, 14. When looking from the back or outside of the channel, the edge of the right hand flange, 13, is extended and bent at right angles and formed into a desired number of spaced collars or bands, 15, for frictionally engaging a hinge pintle, 16. The abutting edge of the reflector member, 11, is likewise provided with complementary hinge collars or bands, 17, which likewise frictionally engage the pintle, 16.

The requirements of the situation are such as to make necessary only a small and light reflector, and but little friction is required both to maintain the clamp in desired vertical adjustment on the pane and to hold the clamp and reflector members in required angular adjustment with respect to each other. The channel is substantially the width of the thickness of the plate glass used in glazing the windows of automobiles, and by pressing the outer edges of the flanges together before putting the device on the pane enough constricting force and friction are developed to maintain the device dependably in adjusted position upon the pane. It will be obvious that this refers to vertical adjustment. Likewise the grip of the collars or bands upon the pintle maintain the clamp and reflector members of the article in dependable adjusted relation.

Having described my invention what I claim as new and desire to secure by Letters Patent is:

For association with an automobile window in which a pane is mounted capable of rotative movement, a side and rear view reflector comprising a clamp element consisting of a longitudinally elongated channel of relatively thin elastic material adapted to engage the top or side edge and contiguous surfaces of said pane, a reflector element a side of which is substantially co-extensive with and extends along a longitudinal edge of said clamp and means for securing the adjacent edges of said reflector element and said clamp rotatively whereby said clamp will permit said pane to be shut or open and the reflector may be positioned parallel and closely adjacent or at an angle therewith.

GEORGE S. SMITH.